2. The passenger conveyor of claim 1 wherein said belt load carrying upper surface has spaced-apart longitudinal ribs and grooves, a threshold comb is mounted on said landing plate structure at said upper edge portion and said comb has a plurality of comb teeth extending into the longitudinal grooves in said load carrying upper surface of the belt at a position after the belt bends inwardly over said terminal pulley for bridging the gap between the load carrying surface of the belt and said upper edge portion of the landing plate structure to assist passengers and objects in making a smooth transition between the surfaces of the belt and landing plate structure.

3. The conveyor of claim 2, wherein said upper load carrying surfaces of said teeth have a lower coefficient of friction than said belt load carrying upper surface whereby the shoes of passengers and objects carried downward on said belt load carrying upper surface into engagement with said comb teeth will slide off the belt over said teeth onto said landing plate structure.

4. The conveyor of claim 3 wherein said supporting surface of the landing plate has a coefficient of friction at least as great as the coefficient of friction of the load carrying upper surface of the belt whereby the weight of the passengers is urged ahead of their feet to maintain the passengers' balance.

* * * * *

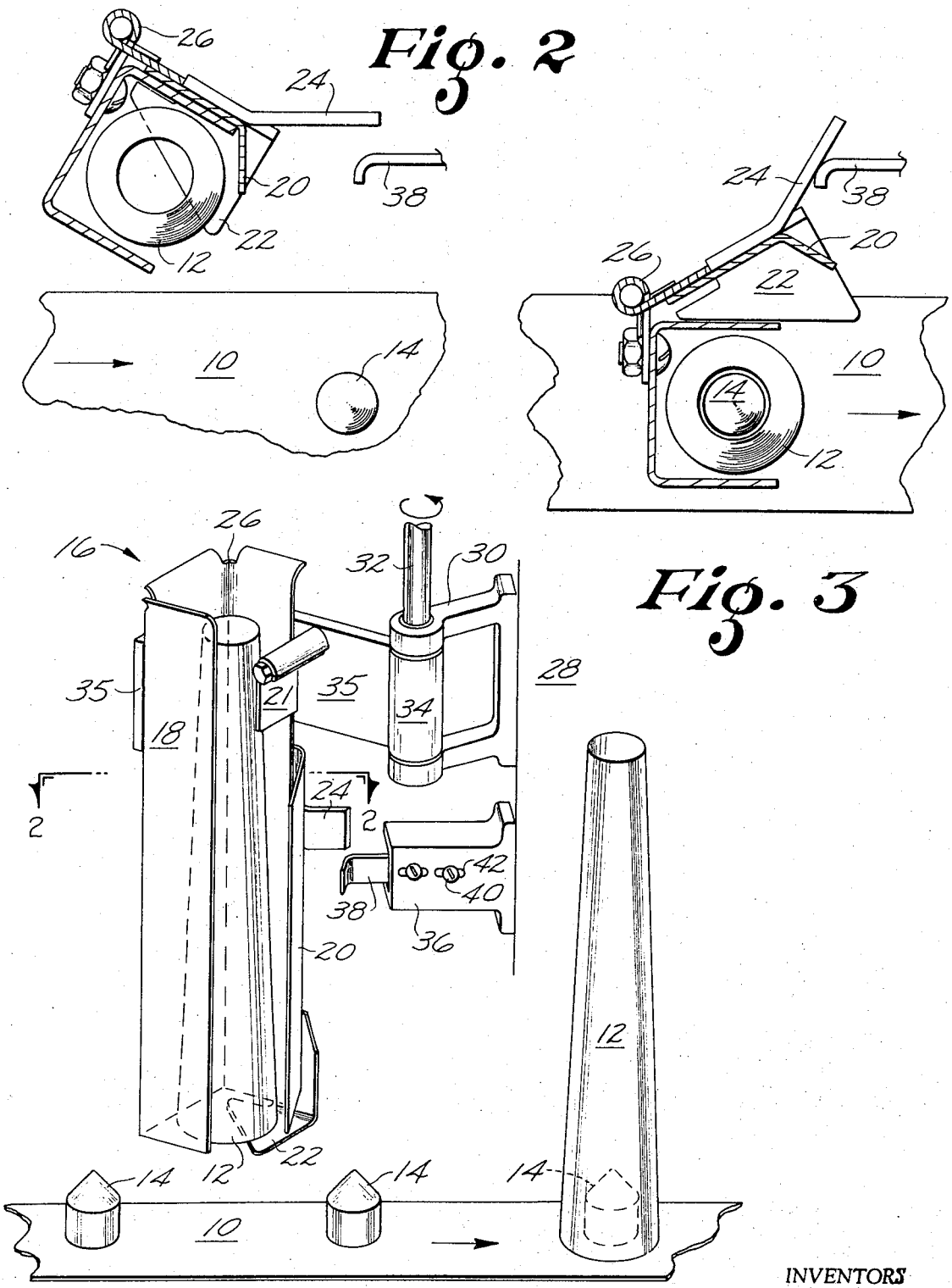

BOBBIN TUBE DELIVERY MEANS

This invention is a continuation-in-part of copending and commonly assigned U. S. Pat. application Ser. No. 865,943, now U.S. Pat. No. 3,603,440 by Lester W. Pray et al., Mr. Pray being a coinventor herein, filed on Oct. 13, 1969 and entitled "Improved Bobbin Cage."

BACKGROUND OF THE INVENTION

The present invention relates to a bobbin tube delivery means for delivering bobbin tubes in an upstanding position onto pegs on a moving conveyor belt, said means containing certain structural features in common with that disclosed and claimed in the aforesaid application.

The invention is especially usefully employed in conjunction with bobbin tube donning apparatuses such as those disclosed in U. S. Pat. No. 3,370,411 entitled "Method and Apparatus for Replacing Bobbin Tubes on Spinning or Twisting Machinery" and in U. S. Pat. application Ser. No. 864,399, now U.S. Pat. No. 3,657,206 by Pray, et al., entitled "Grasper Bar Positioning Mechanism for Automatic Doffing Apparatus," and with bobbin tube feed apparatuses as disclosed in U. S. Pat. No. 3,531,016 entitled "Bobbin Orienting and Loading Apparatus" and in U. S. Pat. application Ser. No. 866,660 now U.S. Pat. No. 3,656,658 by Glazener, et al., entitled "Bobbin Tube Feed Apparatus."

In such latter apparatuses, bobbin tubes fed from a bin are oriented in an up-ended position and axially dropped through a chute to a laterally movable cage member for transfer to and delivery by a conveyor tape in upstanding position to such former donning apparatuses.

In the aforementioned copending application, the movable cage disclosed has three vertically disposed sides and an open fourth side, a bottom only partially closed by horizontally disposed flange seat members and a tube guide means disposed near the top and extending horizontally adjacent the open fourth side for guiding entering tubes into the cage and retaining them bottom seated on the seat members in upstanding position during lateral traverse of the cage from its tube receiving position to its tube discharge position, the latter indexed above receiving pegs upon a moving conveyor belt, which at this indexed position is being turned such that the moving pegs may enter the central bottom cavity of the tube within the cage to engage the inner wall of the tube and in moving urge the tube out of the cage through the open vertical side thereof freeing it of the seat flanges thus permitting the tube to drop a very short distance to the conveyor belt for transport therewith. The construction of the cage member therefore is such as to be employable only with a conveyor being turned at the tube discharge position of traverse of the cage so that the pegs thereon may remove the tube therefrom.

It is to the remedy of this limitation that the present invention is directed. This and other desirable objects of the invention will become apparent from and/or are inherent in the following explanations and descriptions and the appended drawings.

SUMMARY OF THE INVENTION

The present invention provides a bobbin tube delivery means wherein tubes are discharged to and delivered by a conveyor belt which is horizontally disposed and as such has indexable pegs movable beneath the cage and gate means of the invention when the latter has laterally traversed from a tube receiving position away from the conveyor to a discharge position directly over the conveyor.

While the present cage and gate means shares with that disclosed in the aforesaid copending application Ser. No. 865,943 a cage member contoured to contain a bobbin tube and fully open along one side, a guide means for guiding the tube into the cage and for laterally retaining the tube within during traverse and a pivotable gate member normally biased to a closed position along and somewhat overextending at least a portion of the open side of the cage to also laterally retain the tube within the cage during traverse, the present construction differs in having a completely open bottom the seat upon which the tube rests in upstanding orientation during traverse being carried by the gate and the gate also having an outwardly extending member, called herein "key" means for engagement and disengagement with a fixed member attached to the frame of the device bearing the present means for the opening and closing of the gate in concert with its lateral traverse and indexing to the tube discharge position.

The reasons for such present construction and the interconnection and/or interrelationship of components thereof will be more readily understood through the following description of an illustrative embodiment thereof when taken in conjunction with the accompanying drawings in which:

FIG. 1, in fragmentary perspective view, shows the present delivery means with the cage and gate means thereof being pivoted in traverse from the tube receiving to the tube discharge position with the gate closed and the key means out of engagement with the fixed frame member;

FIG. 2, taken approximately along line 2—2 of FIG. 1, is a horizontal section of the delivery means during said traverse; and FIG. 3, also in section as along line 2—2, shows the present means indexed to the tube discharge position.

PREFERRED EMBODIMENT

Referring now more particularly to the drawings, a horizontally moving conveyor 10 for conveying bobbin tubes 12 in an upright orientation on discretely spaced pegs 14 therealong is shown in FIG. 1 to run beneath a cage and gate means, generally designated 16, which latter has a tube cage 18 contoured to retain within a tube 12 and having an open top to receive tube 12 therethrough, an open bottom to permit discharge of tube 12 therethrough upon indexing to the tube discharge position above conveyor 12 and one of pegs 14 and a fully open vertical side at least partially bridged near the top of cage 18 by a tube guide means 21 for lateral retention of tube 12 within cage 18 during traverse thereof, cage 18 being supported for pivotal traverse by an attached arm 35 of bracket 34, which latter encircles and is fixed to a rotatable shaft 32 of a pivoting means which turns shaft 32 in concert with the movement of conveyor 10 such that as cage 18 is indexed to the tube discharge position directly above conveyor 10 one of pegs 14 is directly beneath the open bottom of cage 18. In turn, shaft 32 and with it cage and gate means 16 are supported by a bracket 30 fixed to a wall 28 of the supportive frame (otherwise not shown). Cage and gate means 16 also has a gate 20 which, as shown in FIGS. 1 and 2 in closed position, partially over-extends at least a portion of the open side of cage 18 to retain tube 12 within during traverse, a tube seat means 22 fixed to gate 20 so as to underlay the open bottom of cage 18 during said traverse for purposes of supporting tube 12 within and shown as a horizontally disposed and generally triangular flange and a key means 24 shown best in FIGS. 2 and 3 as a laterally extending flange fixed to gate 20 and extending outward therefrom at an angle exemplarily shown to approximate 90° (see FIGS. 2 and 3) for at times during traverse to engage a fixed member of the frame, later described more fully, for the opening of gate 20 as in FIG. 3, and with it seat 22 to free the bottom opening of cage 18 and permit tube 12 within to fall upon one of pegs 14 and to be transported on conveyor 10 out the open side of cage 18 and to an appropriate apparatus such as for donning onto a textile machine as hereinbefore described, and for at other times during traverse to be out of engagement with said frame member as is shown in FIGS. 1 and 2. Gate 20 and with it seat 22 and key means 24 are connected to and along a side of cage 18 for pivoted opening and closing of gate 20 and the open bottom of cage 18 by means of a spring-biased hinge 26 one leaf of which (shown as the left-hand leaf in FIGS. 2 and 3) is fixed to the side of cage 18 as with nuts and bolts (unnumbered) and with the other leaf fixed to gate 20, hinge 26 normally being biased to close gate 20 by some means such as a torsional spring (not shown) which may be set axial thereof. The fixed frame member with which key means 24 interacts is shown best in FIG. 1 as exemplararily comprising a bracket 36 fixed to frame wall 28 and being pierced with slots therethrough 42 for connection with an extendible arm 38 in the form of a curved flange by means of bolts 40 so that arm 38 may be adjusted to lengthen or shorten the fixed member so as to be engaged and disengaged by key means 24 at appropriate times during the traverse of cage and gate means 16 for the opening and closing of gate 20 and the otherwise open bottom of cage 18.

OPERATION

In operation of the invention, cage and gate means 16 pivoted by clockwise rotation of shaft 32 to a tube receiving position, such as that otherwise shown in FIG. 1 of U. S. Pat. No. 3,531,016, receives tube 12 through the open top of cage 18 which bottom seats itself upon gate seat 22, the tube being laterally retained within cage 18 by closed gate 20 and guide means 21. Thereupon, as shown in FIG. 1, shaft 32 is rotated in the counterclockwise for traverse of cage and gate means 16 to the tube discharge position thereof, as shown in FIG. 3, where means 16 containing tube 12 is indexed over moving conveyor 10 as one of pegs 14 thereon at such time passes beneath means 16. In such traverse, as means 16 approaches conveyor 10, key means 24 is moved into engagement with fixed member flange 38, and as traverse continues key means 24 and with it gate 20 and seat 22 are forced backwards against the bias of the spring-biased hinge 26 to increasingly open both the open side and the open bottom of cage 18; upon full pivoting of cage and gate means 16 to the tube discharge position which is shown in FIG. 3, key means 24 abutting flange 38 has fully forced complete opening of both the open side of and open bottom of cage 18, permitting tube 12 to fall through said unobstructed open bottom onto one of pegs 14 passing therebeneath and at this time indexed therewith and to be removed through the now unobstructed open side of cage 18 on moving conveyor 10.

While the foregoing embodiment shows the key means as a laterally extending flange cooperative to a fixed frame member, it is readily understood that alternately such key means may be attached to the gate and extend therefrom in any suitable manner and/or direction so as to, at appropriate times, engage and disengage a fixed member which latter though shown to be fixed to the wall of a supportive frame also may be appropriately located and fixed to any stationary object to effect the presently required need of key means engagement and disengagement.

While it may be convenient to turn or rotate cage and gate means automatically through shaft 32 and a drive means interconnected therewith and with conveyor 10 for permitting proper indexing of cage and gate means 16 with that of one of pegs 14 at the tube discharge position, say through gearing, clutch mechanisms and sensing device controlling devices, it is even possible to provide such concerted movements of cage and gate means 16 manually such as by the turning of a crank attached to shaft 32; therefore, in these regards the invention is not limited to the particular manner or any particular means for pivoting the cage and gate means.

Other variations in construction will readily be apparent to those skilled in the art from the specific preferred embodiment hereinbefore described, which attain the objects here obtained and fall within the scope of the claims hereunder.

We claim:

1. Bobbin tube delivery means comprising
    a horizontally movable conveyor having thereon at discretly spaced intervals therealong tube-receiving pegs,
    a stationary element fixed away from and in proximity to said conveyor,
    cage and gate means for receiving, retaining therewithin, conveying and discharging therefrom a bobbin tube from a tube receiving position spaced away from said conveyor to a tube discharge position indexed above said conveyor pegs, comprising
    cage means pivotally mounted adjacent said conveyor for traverse between said tube receiving and discharging positions having an open side formed to permit a bobbin tube to pass laterally therethrough, an open top and an open bottom formed to permit a bobbin tube to pass axially therethrough by gravity,
    gate means pivotally attached to said cage means and biased to at least partially overextend said open side of said cage means sufficient to laterally retain therewithin a bobbin tube,
    tube seat means fixed to said gate means and pivotable therewith, underlaying said open bottom of said cage means to at least partially overextend said bottom sufficient to support a bobbin tube within said cage means at said tube receiving position and intermediate there and said tube discharge position, gate key means fixed to said gate means and extending therefrom for engagement with and disengagement with said stationary member for opening said gate means against said bias and said open side of said cage thereby to permit lateral passage of said bobbin tube therethrough at said tube discharge position and for closing said gate means under the said bias so as to overextend said open side of said cage means at other positions thereof, and pivoting means for pivoting said cage and gate means between said tube receiving and said tube discharge positions.

2. Bobbin tube delivery means as in claim 1, wherein said gate key means is fixed to and extends from a side of said cage means.

3. Bobbin tube delivery means as in claim 1, wherein said stationary element has an extensibly adjustable member which is engagable and disengable with said key means.

4. Bobbin tube delivery means as in claim 1, wherein said tube seat means is in the form of a horizontal flange.

5. Bobbin tube delivery means as in claim 1, wherein said horizontally movable conveyor and said pivoting means are interconnected by an interconnecting means for moving said conveyor and said cage and gate means in concert to position said cage means over one of said pegs at the tube discharge position and to move said cage means therefrom at other times to and away from said tube receiving position.

6. Bobbin tube delivery means as in claim 2, wherein said gate key means is in the form of a flange.

7. Bobbin tube delivery means as in claim 4, wherein said horizontal flange is triangular in shape.

8. Bobbin tube delivery means as in claim 5, wherein said pivoting means contains a rotatable shaft connected to said cage and gate means in spaced relation for pivoting thereabout.

9. In combination with a bobbin tube apparatus for donning bobbin tubes onto a textile machine, a bobbin tube orienting apparatus for orienting bobbin tubes axially vertical, and means for delivering said tubes in said orientation to said donning apparatus, the improvement comprising said delivery means comprising a horizontally movable conveyor having thereon at discretely spaced intervals therealong tube-receiving pegs, a stationary element fixed away from and in proximity to said conveyor, cage and gate means for receiving, retaining therewithin, conveying and discharging therefrom a bobbin tube received from said orienting apparatus from a position adjacent said apparatus to a tube discharge position indexed above said conveyor pegs, comprising cage means pivotally mounted adjacent said conveyor for traverse between said tube receiving and discharge positions having an open side formed to permit a bobbin tube to pass laterally therethrough, an open top and an open bottom formed to permit a bobbin tube to pass axially therethrough by gravity, gate means pivotally attached to said cage means and biased to at least partially overextend said open side of said cage means sufficient to laterally retain therewithin a bobbin tube, tube seat means fixed to said gate means and pivotable therewith, underlaying said open bottom of said cage means to at least partially overextend said bottom sufficient to support a bobbin tube within said cage means at said tube receiving position and intermediate said receiving position and said tube discharge position, gate key means fixed to said gate means and extending therefrom for engagement with and disengagement from said stationary element for opening said cage and gate means upon said engagement at the tube discharge position to discharge said tube thereat onto one of said pegs and for closing said cage and gate means upon said disengagement at other positions thereof, and pivoting means for pivoting said cage and gate means between said tube receiving and discharge positions.

10. The improvement as in claim 9, wherein gate key means is in the form of a flange fixed to and extending from a side of said gate means, said tube seat means is in the form of a horizontal flange which is triangular in shape and said stationary element has an extendibly adjustable member which is engageable and disengageable with said gate key flange.

* * * * *

UNITED STATES PATENT OFFICE
CERTIFICATE OF CORRECTION

Patent No. 3,698,536                    Dated October 17, 1972

Inventor(s) Lester W. Pray and Clinton C. Zerfoss

It is certified that error appears in the above-identified patent and that said Letters Patent are hereby corrected as shown below:

On the Face Sheet, "Attorney-Donald H. Feldman" should read -- Agent-Donald H. Feldman --.

Column 1, line 27, "Ser. No. 866,660 now U. S. Pat. No. 3,656,658 by" should read -- Ser. No. 866,660 now U. S. Pat. No. 3,601,283 by --.

Column 5, line 20, Claim 2, "of said cage means" should read -- of said gate means --.

Column 6, line 42, Claim 10, "wherein gate key" should read -- wherein said gate key --.

Signed and sealed this 11th day of March 1975.

(SEAL)
Attest:

RUTH C. MASON
Attesting Officer

C. MARSHALL DANN
Commissioner of Patents
and Trademarks